C. F. JOHNSON, Jr.

Fertilizer-Sower.

No. 8,247. Reissued May 21, 1878.

WITNESSES

Alexander Malow

John S. Center.

INVENTOR

Chas. F. Johnson Jr.

by A. M. Smith

Attorney

UNITED STATES PATENT OFFICE.

CHARLES F. JOHNSON, JR., OF OWEGO, NEW YORK.

IMPROVEMENT IN FERTILIZER-SOWERS.

Specification forming part of Letters Patent No. 154,870, dated September 8, 1874; Reissue No. 8,247, dated May 21, 1878; application filed May 15, 1878.

*To all whom it may concern:*

Be it known that I, CHARLES F. JOHNSON, Jr., of Owego, county of Tioga, State of New York, have invented certain new and useful Improvements in Fertilizer-Sowers, of which the following is a full, clear, and exact description, reference being had to the accompanying drawings, making part of this specification, in which—

Figure 1:
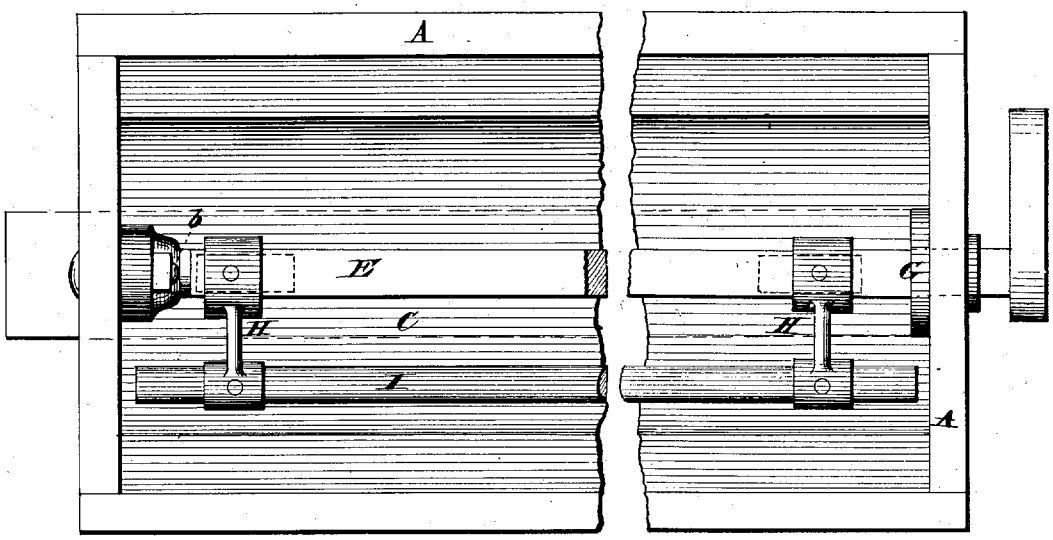
Figure 2:
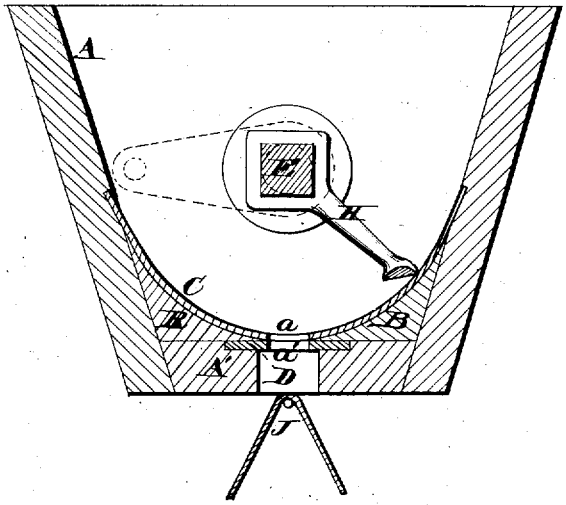

Figure 1 represents a plan view, and Fig. 2 a transverse vertical section, of a fertilizer box or hopper with my improvements applied.

Similar letters of reference refer to the same parts in both figures.

In the distribution of fertilizers by machines as ordinarily constructed for that purpose, great difficulty has been experienced in effecting their even and regular discharge, owing to the sticky or adhesive nature characteristic, to a greater or less extent, of all materials employed in a pulverized condition for fertilizing purposes, this property producing a constant tendency to compact the material in the hopper, and thus cause it to arch over the discharge outlets or openings, thereby stopping the flow or discharge of the material.

The object of my improvement is to overcome this difficulty; and to this end my invention consists, first, in the combination, with the curved metallic hopper-bottom, of a vibrating wiper or scraper extending lengthwise of the hopper over the discharge outlets or openings, and the intervening spaces for preventing the arching of the fertilizing material, as hereinafter explained.

It further consists in providing a wiper extending lengthwise of a hopper having a curved bottom, as described, with a sharp cutting-edge, adapting it to pass through and to remove the fertilizing material adhering to or in contact with the hopper-bottom with diminished resistance or friction, as hereinafter explained.

It further consists in a novel construction and arrangement of the rock-shaft and its attachments, the rock-shaft being provided with malleable arms, to which the thin iron wiper is attached, for a purpose which will be explained; and it further consists in arranging the longitudinal wiper with its lower face inclined to the curved bottom of the hopper, for adapting it to force the fertilizing material outward through the discharge-openings in its passage over the same, as hereinafter explained.

In the accompanying drawings, A represents the fertilizer box or hopper, having its lower front and rear corners or angles filled in at B, to give the bottom the curved or concave form in transverse section shown in Fig. 2.

This curved portion is covered by sheet metal C, preferably of galvanized iron, bent into trough shape, conforming to the shape of and forming the hopper-bottom. The bottom thus formed is pierced with holes at suitable distances apart, forming discharge-outlets, and the wooden bottom A′ is grooved longitudinally on its upper face, to receive a slide, D, pierced with holes *a*′, corresponding in size to the holes *a* in the metal bottom C, and adapted to slide longitudinally in close contact therewith, for opening, closing, or partly closing, the discharge-openings *a*, as desired. E is a rock-shaft, made square or polygonal in form, with one end, *b*, rounded to form a journal, and provided near its other end with a round casting or collar, G, forming a second journal, and adapting the shaft to rock or oscillate in its bearings, operated from the ground-wheel of the machine by gearing and crank or other suitable device.

If the length of the shaft E should make it necessary, it may be provided with a central bearing to keep it from sagging.

On this rock-shaft is mounted a series of malleable-iron arms, H H, adapted at their lower ends to receive a thin metal wiper, I, extending lengthwise of the hopper and riveted to the arms H, with its lower face set at an angle inclining from the edge in contact or in close proximity with the bottom, away from said bottom, as shown.

The wiper is shown rounded upward from its sides or edges on its upper face, this construction bringing it to a sharp cutting or scraping edge, as shown—a form adapting it more readily to penetrate or cut its way through the mass of fertilizer, and also to remove or scrape away any portion thereof adhering to the hopper-bottom, with less friction than where a different form of wiper is employed.

By giving the lower face of the wiper the angular position or the inclined relation to the hopper-bottom shown and described, its movement or vibration tends to press or force the material between it and the hopper-bottom outward through the discharge-outlets, and thus to prevent the latter from becoming clogged, while the cutting-edge of the wiper, by moving in close proximity with the curved bottom, serves to cut or scrape off any of the material that would otherwise adhere thereto.

The wiper I is shown made continuous—that is to say, extending from end to end of the hopper (a slight space being allowed at each end for clearance) on a line parallel with the rock-shaft E, and sweeping the space or spaces intervening between the discharge openings or outlets *a*. By this arrangement, whereby the wiper is made to extend over two or more openings, it will be seen that the fertilizing material will be prevented from arching between said openings, and thereby obstructing its discharge, while by extending it the whole length of the box the entire mass of fertilizer will be agitated and cut loose the entire length of the bottom at every vibration, and arching at any point effectually prevented.

By fastening the wiper and arms to the rock-shaft and making the former continuous, as described, a truss form is obtained, giving great stiffness in a vertical direction, and the rock-shaft is prevented from springing up from the bottom between its bearings.

It is especially important that the wiper vibrate close to the edges of the holes, in order to keep them open. For this reason the arms should be arranged directly over the holes, for preventing the wiper from springing or being bent up at these points by pieces of bone or foreign substances getting between it and the hopper-bottom.

By making the hopper-bottom and the graduating-slide of thin metal, as shown and described, the liability of the fertilizer to stick to the side walls of the discharge-outlets, and thus obstruct them, is greatly diminished; and the openings through the wooden bottom underneath the slide being made of increased diameter, as shown, all liability of the fertilizer being caught and obstructed in its discharge thereby is obviated.

By making the rock-shaft square or polygonal in form, the arms H, provided with sleeves or sockets conforming in shape thereto, are adapted to be readily slipped on or off for renewal or repairs, while at the same time the form of the shaft insures their being brought into line with each other and their vibration with the shaft when in place thereon, while by making the arms H malleable the wipers, riveted to their outer ends, are adapted to be readily removed and replaced, when injured or broken, without liability of injuring or breaking the arms, thereby greatly diminishing the cost of repairs. Further, by making the arms of a malleable casting, they can be made thin, so as to offer less resistance in passing through the mass of fertilizer, and at the same time be made strong in the direction of the strain, and they will thereby accomplish the important object of having as much open space as possible between the shaft and the wiper, thus keeping the fertilizer loose and avoiding the liability of packing at either extremity of the sweep.

It is obvious that other methods of attaching the shaft to the wiper may be employed; but my experiments indicate that the method I have adopted presents decided advantages in operation.

The wiper, at each throw or vibration, either cuts away a small portion from the bottom of the mass of fertilizing material or forces it through the discharge-outlets, as explained, and the jolting of the machine in its passage over the ground, assisted by the jar caused by the frequent and sudden change of direction of vibration of the rock-shaft and its attachments, causes the superincumbent mass of fertilizer to instantly settle down behind the wiper, and thus to fill the place of the portion removed, thereby keeping up the supply of material at the discharge-openings always in the loosened condition, adapting it to pass readily through said openings.

Where the fertilizer-distributer is connected with a grain-drill, the fertilizer, as it is discharged, passes through the drill-tubes to the ground, in the usual manner; but when used detached or separately, for the purpose of spreading it evenly over the surface of the ground, an inverted V-shaped piece, J, of zinc or other thin metal, is employed, arranged directly under the discharge-opening, said device serving to divide and spread the fertilizing material, throwing one part of it forward and the other to the rear, causing it to reach the ground in a fine shower.

Parts of the machine not particularly described may be constructed and arranged in any usual or preferred manner.

Having now described my improvements, what I claim as new, and desire to secure by Letters Patent, is—

1. In a fertilizer-distributer, the combination, with the curved metallic bottom of the hopper, of a vibrating wiper extending lengthwise of the hopper, so as to pass at each vibration under the bottom of the whole, or nearly the whole, of the fertilizing material, substantially as described.

2. The combination, with a fertilizer-hopper having a curved bottom, of a continuous vibrating wiper extending lengthwise of said hopper, and provided with the sharp cutting or scraping edge, substantially as and for the purpose set forth.

3. In a fertilizer-distributer, the rock-shaft E, in combination with the iron arms H and the thin metal wiper attached to said arms, substantially as described.

4. In a fertilizer-distributer, the combination, with a curved and perforated metallic hopper-bottom, of a vibrating wiper having its lower face set inclined to said bottom, substantially as and for the purpose set forth.

CHARLES F. JOHNSON, JR.

Witnesses:
THEO. D. GERE,
J. A. MABEE.